(12) United States Patent
Huang et al.

(10) Patent No.: US 11,646,465 B2
(45) Date of Patent: *May 9, 2023

(54) BATTERY PACK, VEHICLE AND CONTROL METHOD FOR ALLEVIATING SPREADING OF THERMAL RUNAWAY OF BATTERY PACK

(71) Applicant: Contemporary Amperex Technology Co., Limited, Ningde (CN)

(72) Inventors: Xiaoteng Huang, Ningde (CN); Jiarong Hong, Ningde (CN); Wenli Wang, Ningde (CN); Yanhuo Xiang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,262

(22) Filed: Dec. 2, 2021

(65) Prior Publication Data

US 2022/0209333 A1 Jun. 30, 2022

Related U.S. Application Data

(63) Continuation of application No. PCT/CN2020/107773, filed on Aug. 7, 2020.

(30) Foreign Application Priority Data

Sep. 26, 2019 (CN) .......................... 201910914629.X

(51) Int. Cl.
*H01M 10/6568* (2014.01)
*H01M 10/613* (2014.01)
(Continued)

(52) U.S. Cl.
CPC ....... *H01M 10/6568* (2015.04); *B60L 3/0046* (2013.01); *B60L 58/24* (2019.02);
(Continued)

(58) Field of Classification Search
CPC ............. H01M 10/613; H01M 10/651; H01M 10/6568; B60L 58/24
See application file for complete search history.

(56) References Cited

U.S. PATENT DOCUMENTS 7,433,794 B1 10/2008 Berdichevsky et al.
9,806,310 B1 10/2017 Pounds
(Continued)

FOREIGN PATENT DOCUMENTS

CN 104882639 A * 9/2015 ........ H01M 10/4235
CN 104882639 A 9/2015
(Continued)

OTHER PUBLICATIONS

"Carbon Dioxide (CO2)", CONCOA precisions gas controls, https://www.concoa.com/co2_properties.html, accessed May 4, 2022. (Year: 2022).*

(Continued)

*Primary Examiner* — Jonathan G Jelsma
(74) *Attorney, Agent, or Firm* — East IP P.C.

(57) ABSTRACT

The application discloses a battery pack, vehicle and control method for alleviating spreading of thermal runaway of a battery pack. The battery pack includes: a plurality of secondary batteries, a housing of each of which includes a weakened portion, so that a heat flow resulting from thermal runaway of the secondary battery is able to break through the weakened portion to be discharged; a spray pipeline which is arranged corresponding to and at a spacing from weakened portions of the secondary batteries, at least a portion of the spray pipeline corresponding to the weakened portions (Continued)

being a breakthrough region which is able to form an opening under an action of the heat flow, a spray medium in the spray pipeline being sprayed to an abnormal secondary battery in thermal runaway via the opening; where a weight A of the sprayed spray medium is determined according to an equation $(0.8A)^{0.85} \times D/B \geq 2.6$.

17 Claims, 3 Drawing Sheets

(51) Int. Cl.
  *H01M 10/651* (2014.01)
  *B60L 58/24* (2019.01)
  *H01M 10/625* (2014.01)
  *B60L 3/00* (2019.01)

(52) U.S. Cl.
  CPC ....... *H01M 10/613* (2015.04); *H01M 10/625* (2015.04); *H01M 10/651* (2015.04); *H01M 2220/20* (2013.01)

(56) References Cited

U.S. PATENT DOCUMENTS

| | | | |
|---|---|---|---|
| 2010/0136391 A1* | 6/2010 | Prilutsky | H01M 10/6564 429/62 |
| 2013/0312947 A1 | 11/2013 | Bandhauer et al. | |
| 2016/0172727 A1 | 6/2016 | Chan et al. | |
| 2017/0179551 A1 | 6/2017 | Shepard et al. | |
| 2018/0062224 A1 | 3/2018 | Drabon et al. | |
| 2019/0123405 A1 | 4/2019 | Jeon et al. | |
| 2020/0212524 A1* | 7/2020 | Wang | A62C 35/026 |
| 2020/0303789 A1* | 9/2020 | Macdonald | B64D 27/24 |
| 2020/0335841 A1* | 10/2020 | Powell | H01M 10/6569 |

FOREIGN PATENT DOCUMENTS

| | | | | | |
|---|---|---|---|---|---|
| CN | 106684499 | A | | 5/2017 | |
| CN | 106785182 | A | | 5/2017 | |
| CN | 106816668 | A | | 6/2017 | |
| CN | 107398049 | A | | 11/2017 | |
| CN | 107658512 | A | | 2/2018 | |
| CN | 108075084 | A | | 5/2018 | |
| CN | 108237927 | A | | 7/2018 | |
| CN | 109103539 | A | | 12/2018 | |
| CN | 109244594 | A | | 1/2019 | |
| CN | 109244594 | A | * | 1/2019 | ............ H01M 10/48 |
| CN | 208835139 | U | | 5/2019 | |
| CN | 208908248 | U | | 5/2019 | |
| CN | 110013626 | A | | 7/2019 | |
| CN | 209104233 | U | | 7/2019 | |
| CN | 209434244 | U | | 9/2019 | |
| CN | 209490404 | U | * | 10/2019 | ............. A62C 3/065 |
| EP | 3675214 | A1 | * | 7/2020 | ............... A62C 3/07 |
| JP | 2000035229 | A | | 2/2000 | |
| JP | 2009037934 | A | | 2/2009 | |
| JP | 2014192028 | A | | 10/2014 | |
| JP | 2017147128 | A | | 8/2017 | |
| KR | 20140064176 | A | | 5/2014 | |
| WO | WO-2018105878 | A1 | * | 6/2018 | ............... A62C 3/16 |

OTHER PUBLICATIONS

The First Office Action for China Application No. 201910914629.X, dated Jun. 22, 2021, 8 pages.
The International search report for PCT Application No. PCT/CN2020/107773, dated Nov. 6, 2020, 16 pages.
The Notification of Grant for China Application No. 201910914629.X, dated Aug. 9, 2021, 8 pages.
The extended European search report for EP Application No. 20869350.7, dated Apr. 8, 2022, 12 pages.
The First Office Action for Indian Application No. 202127056611, dated Jun. 2, 2022, 8 pages.
The Official Action and search report dated Aug. 9, 2022 for Japanese application No. 2021-551826, 14 pages.

* cited by examiner

BATTERY PACK, VEHICLE AND CONTROL METHOD FOR ALLEVIATING SPREADING OF THERMAL RUNAWAY OF BATTERY PACK

CROSS REFERENCE TO RELATED APPLICATION

This application is a continuation of International Application No. PCT/CN2020/107773 filed on Aug. 7, 2020, which claims the priority benefits of Chinese Patent Application No. 201910914629.X filed on Sep. 26, 2019, both of which are incorporated herein by reference in their entireties.

FIELD

The application relates to the technical field of energy storing device, and in particular to a battery pack, a vehicle and a control method for alleviating spreading of thermal runaway of battery pack.

BACKGROUND

New energy electric vehicles are becoming more and more popular as the problem of environmental protection receives increasing attention. The endurance mileage of an electric automobile is relevant to the energy density of a battery pack. In order to obtain high energy, the current battery packs employ relatively large number of secondary batteries for combination of series-parallel connection. As the energy density of the battery pack becomes higher and higher, the problem of thermal safety becomes more and more serious. The safety of the battery pack has a direct impact on the safety for the electric automobile as well as the passengers, and thus the safety problem for the battery pack has become a barrier to the further promotion of electric automobiles. It has become an urgent technical problem how to effectively solve the safety problem for the battery pack.

SUMMARY

A first aspect of the application provides a battery pack including:

a plurality of secondary batteries, a housing of each of which includes a weakened portion, so that a heat flow resulting from thermal runaway of the secondary battery is able to break through the weakened portion to be discharged;

a spray pipeline which is arranged corresponding to and at a spacing from weakened portions of the secondary batteries, at least a portion of the spray pipeline corresponding to the weakened portions being a breakthrough region which is able to form an opening under an action of the heat flow, a spray medium in the spray pipeline being sprayed to an abnormal secondary battery in thermal runaway via the opening;

a weight A of the spray medium which is sprayed to alleviate the spreading of the thermal runaway of the abnormal secondary battery is determined according to an equation (1), $$\frac{(0.8A)^{0.85} \times D}{B} \geq 2.6 \qquad (1)$$

in which A indicates the weight of the spray medium by kg; D indicates a latent heat of the spray medium by kJ/kg; B indicates a capacity of the secondary battery by Ah.

Optionally, $$2.6 \leq \frac{(0.8A)^{0.85} \times D}{B} \leq 17.48.$$

Optionally, $$2.63 \leq \frac{(0.8A)^{0.85} \times D}{B} \leq 5.36.$$

In any of the above embodiments in the first aspect of the application, the latent heat D of the spray medium may be above 100 kJ/kg. Optionally, D is 200 kJ/kg-5000 kJ/kg, further optionally 200 kJ/kg-2000 kJ/kg.

In any of the above embodiments in the first aspect of the application, a spray pressure P of the spray pipeline may be determined according to an equation (2), $$\frac{P}{(0.06B + 5)} \geq 1 \qquad (2)$$

in which P indicates the spray pressure of the spray pipeline by kPa, and B indicates the capacity of the secondary battery by Ah.

Optionally, $$\frac{P}{(0.06B + 5)} \geq 1.4.$$

In any of the above embodiments in the first aspect of the application, a spray pressure P of the spray pipeline may be above 10 kPa, optionally within 12 kPa-150 kPa.

In any of the above embodiments in the first aspect of the application, the breakthrough region of the spray pipeline may face directly towards the weakened portions of the secondary batteries.

In any of the above embodiments in the first aspect of the application, the spray medium may be one or more selected from: fire-control gas, fire-control liquid, fire-control colloid and fire-control powder. Optionally, the spray medium is one or more selected from: water, ethylene glycol, liquid nitrogen, liquid argon, liquid carbon dioxide, liquid heptafluoropropane and fluorinated ketone.

In any of the above embodiments in the first aspect of the application, the battery pack may further includes a storage case; the spray pipeline is connected to the storage case and at least a portion of the spray pipeline is located above the secondary batteries; or the spray pipeline includes a plurality of pipeline units arranged in parallel, each of which is arranged corresponding to at least one of the secondary batteries and is connected to the storage case.

In any of the above embodiments in the first aspect of the application, the storage case may be optionally arranged higher than the breakthrough region of the spray pipeline.

In any of the above embodiments in the first aspect of the application, the storage case may include:

a case body including a cavity;

a separator located in the cavity of the case body, the separator separating the case body into a liquid storage part and a gas storage part, where the liquid storage part is in communication with the spray pipeline, the gas storage part including an inlet for inflow of a compressed gas, the separator being able to drive the spray medium in the liquid storage part into the spray pipeline under an action of the compressed gas in the gas storage part.

In any of the above embodiments in the first aspect of the application, the separator may be an elastic separator film, optionally an involucra; or the separator may be a separator plate slidably connected to an inner wall of the case body.

In any of the above embodiments in the first aspect of the application, the storage case may include:

a case body including a cavity;

a drive device disposed in the cavity of the case body, the drive device including an elastic member and a drive member, the elastic member being connected to the drive member, the drive member and a wall of the storage case enclosing and forming a liquid storage part in communication with the spray pipeline;

the drive member is able to drive the spray medium in the liquid storage part into the spray pipeline under an action of an elastic force of the elastic member.

In any of the above embodiments in the first aspect of the application, the breakthrough region includes a hot melt part to melt under an action of the heat flow sprayed by the weakened portion of the secondary battery in order to form the opening; or the breakthrough region includes a stress concentration part to break up under an impact action of the heat flow sprayed by the weakened portion of the secondary battery in order to form the opening.

In any of the above embodiments in the first aspect of the application, a melting point of the hot melt part may be 200° C.-500° C., optionally 300° C.-500° C.

In any of the above embodiments in the first aspect of the application, the weakened portion may be a vent disposed on the housing; or the weakened portion may be formed through providing a notch or a thickness-reduced region on the housing.

A second aspect of the application provides a vehicle including the battery pack according to the first aspect of the application.

A third aspect of the application provides a control method for alleviating spreading of thermal runaway of a battery pack, in which the battery pack is the battery pack according to the first aspect of the application, the method including:

the heat flow resulting from thermal runaway of the secondary battery breaking through the weakened portion and acting on the spray pipeline, so that the breakthrough region forms the opening under an action of the heat flow;

the spray medium being sprayed to the secondary battery in thermal runaway via the opening to alleviate the spreading of the thermal runaway of the secondary battery.

In the battery pack, the vehicle and the control method for alleviating spreading of thermal runaway of the battery pack as provided by the application, the heat flow resulting from thermal runaway of the secondary battery can break through the weakened portion of its housing to be discharged and act on the breakthrough region of the spray pipeline. The breakthrough region is able to form an opening under an action of the heat flow, so that the spray medium in the spray pipeline is sprayed to an abnormal secondary battery in thermal runaway via the opening. Also, the weight A of the spray medium which is sprayed to alleviate the spreading of the thermal runaway of the abnormal secondary battery satisfies the equation (1). Thus, the spray medium can effectively reduce the high temperature resulting from thermal runaway of a secondary battery and prevent the heat from spreading to other secondary batteries, so that the thermal runaway of the abnormal secondary battery is controlled effectively while the spreading of the thermal runaway in the battery pack is alleviated effectively. Therefore, the battery pack of the application has a relatively high safety performance.

BRIEF DESCRIPTION OF THE DRAWINGS

In order to illustrate the technical solutions in embodiments of the application more clearly, the drawings to be used in the embodiments of the application will be briefly described below. Obviously, the drawings described below are merely some embodiments of the application, and it is also possible for a person of ordinary skill in the art to obtain further drawings from these drawings without creative work.

Figure 1:
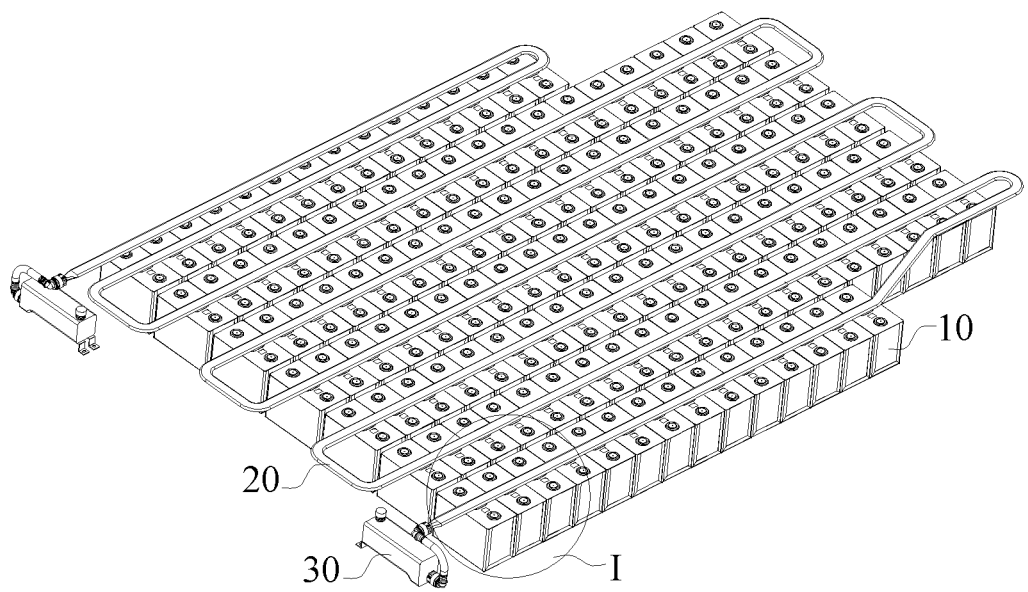
FIG. 1 is a schematic structural view of a battery pack according to an embodiment of the application with the external packing and other accessories of the battery pack being omitted.

LIST OF REFERENCES 10 secondary battery; 11 weakened portion;
20 spray pipeline; 21 breakthrough region; 22 pipeline unit;
30 storage case; 31 case body; 31a liquid storage part; 31b gas storage part; 32 separator; 33 drive device; 33a elastic member; 33b drive member; 33c limit member; c1 first limit arm; c2 second limit arm;
40 sparger; 41 connection port.

It should be noted that the drawings are not plotted in actual proportion.

DETAILED DESCRIPTION

For more clearly understanding of the inventive purpose, technical solution and beneficial technical effect of the application, the application will be described in further details in combination with the embodiments. It is to be appreciated that the embodiments described herein are only intended to explain the application rather than to limit it.

For the sake of simplicity, only some numerical ranges are explicitly disclosed herein. However, any low limit may be combined with any high limit to form an unspecified range, and any lower limit may be combine with other lower limits to form an unspecified range, and also, any upper limit may be combined with any other upper limits to form an unspecified range. In addition, although not explicitly stated, each point or individual value between the endpoints of a range is to be contained within the range. Thus, each point or individual value may be combined as its own lower or upper limit with any other point or individual value or with other lower or upper limits to form an unspecified range.

In the description herein, it is noted that, except as otherwise noted, the term "a number of" means one or more; "a plurality of" means two or more; "above", "below" means including the number; the orientation or position relationship indicated by the terms "upper", "lower", "left", "right", "inner", "outer" and the like is the orientation or position relationship as shown in the drawings, which is only for the purpose of description and brief description, rather than indicating or implying that the noted device or element is necessarily of the specific orientation or structured or operated in the specific orientation, thus, can not be regarded as limiting of the application.

In the description of the application, it is also noted that, except as otherwise stipulated or limited explicitly, the terms "mount", "link", "connect" shall be interpreted expansively, for example, it may be fixed connection, removable connection or integral connection; may be direct connection or indirect connection via an intermediate medium. For a person of ordinary skill in the art, the specific meaning of the above terms in the application can be interpreted depending on the specific situation.

In the description herein, the term "or" is inclusive unless otherwise indicated. In other word, that phrase "A or B" means "A, B, or both A and B". More specifically, the condition "A or B" is satisfied by any of the following conditions: A is true (or present) and B is false (or not present); A is false (or not present) while B is True (or is present); or both A and B are true (or are present).

The above summary of the application is not intended to describe each and every embodiment or implementation disclosed by the application. The following description exemplify the exemplary embodiments in more detail. In various places throughout the application, guidance is provided by a series of embodiments which may be used in various combinations. In various embodiments, the enumeration is merely a representative group and should not be construed as exhaustive.

Figure 2:
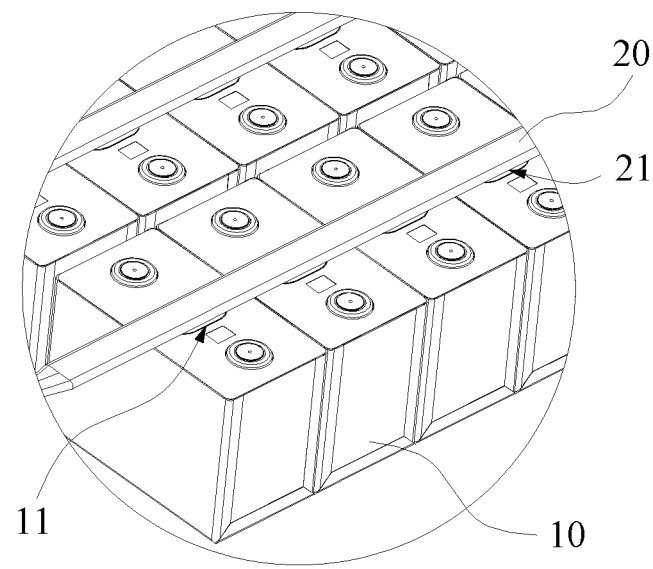
FIG. 2 is a schematic partial enlarged view of FIG. 1.

In order to solve the thermal safety problem of the battery pack and improve the safety performance of the battery pack, an embodiment of the application provides a battery pack. Referring to FIGS. 1 and 2, the battery pack in an embodiment of the application includes a plurality of secondary batteries 10 and a spray pipeline 20.

A housing of each secondary battery 10 includes a weakened portion 11, so that a heat flow resulting from thermal runaway of the secondary battery 10 is able to break through the weakened portion 11 to be discharged.

The spray pipeline 20 is arranged corresponding to and at a spacing from the weakened portions 11. At least a portion of the spray pipeline 20 corresponding to the weakened portions 11 is a breakthrough region 21 which is able to form an opening under an action of the heat flow. The spray medium in the spray pipeline 20 is sprayed to an abnormal secondary battery 10 in thermal runaway via the opening.

In the battery pack, a weight A of the spray medium which is sprayed to alleviate the spreading of the thermal runaway of the abnormal secondary battery 10 is determined according to an equation (1), $$\frac{(0.8A)^{0.85} \times D}{B} \geq 2.6 \quad (1)$$

in which A indicates the weight of the spray medium by kg; D indicates a latent heat of the spray medium by kJ/kg; B indicates a capacity of the secondary battery by Ah.

Only numerical calculation is involved in the equation (1). For example, the weight A of the spray medium is 0.27 kg, the latent heat D of the spray medium is 2000 kJ/kg, and the capacity B of the secondary battery is 180 Ah, that is, $$\frac{(0.8A)^{0.85} \times D}{B} = \frac{(0.8 \times 0.27)^{0.85} \times 2000}{180} = 3.02 > 2.6.$$

In the battery pack of the embodiment of the application, the heat flow resulting from thermal runaway of the secondary battery 10 can break through the weakened portion 11 of its housing to be discharged and act on the breakthrough region 21 of the spray pipeline 20. The breakthrough region 21 can form an opening under an action of the heat flow, so that the spray medium in the spray pipeline 20 is sprayed to the abnormal secondary battery 10 in thermal runaway via the opening. Also, the weight A of the spray medium which is sprayed to alleviate the spreading of the thermal runaway of the abnormal secondary battery 10 satisfies the equation (1). Thus, the spray medium can effectively reduce the high temperature resulting from thermal runaway of the secondary battery 10 and prevent the heat from spreading to other secondary batteries 10, so that the thermal runaway of the abnormal secondary battery 10 is controlled effectively while the spreading of the thermal runaway in the battery pack is alleviated effectively. Therefore, the battery pack in the embodiment of the application has a relatively high safety performance.

Optionally, $$2.6 \leq \frac{(0.8A)^{0.85} \times D}{B} \leq 17.48.$$

Optionally, $$2.63 \leq \frac{(0.8A)^{0.85} \times D}{B} \leq 5.36.$$

In addition, in the battery pack in the embodiment of the application, it is the heat flow discharged upon thermal runaway of the secondary battery 10 that triggers the spray pipeline 20 to spray. The battery pack responds quickly and accurately to thermal runaway of the secondary battery 10. In addition, the thermal runaway monitoring device and the spray control device provided in the battery pack may be dispensed with, so that the structure thereof is simple, and in particular, both the weight and the volume of the battery pack are relatively small, which is advantageous for it to have a high weight energy density and volumetric energy density.

The type of the secondary battery 10 is not particularly limited in the application, in which materials known in the art may be used for each of the positive and negative electrode active materials, the electrolyte, and the like. The secondary battery 10 generally encapsulates the electrode assembly and the electrolyte in the housing. In the housing of the secondary battery 10, the weakened portion 11 may be a vent disposed on the housing. Or the weakened portion 11 may be formed through providing a notch or a thickness-reduced region on the housing of the secondary battery 10.

The various materials in the secondary battery 10 undergo a reaction such as thermal decomposition or even combustion upon thermal runaway, and the internal temperature and pressure are rapidly increased. When the pressure in the secondary battery 10 reaches at a certain limit, the high-temperature and high-pressure mixed fluid may break through the weakened portion 11 of the housing to reduce the pressure inside the housing for the function of explosion-proof. That is, the heat flow is a high-temperature, high-pressure mixed fluid which is sprayed via the weakened portion 11 upon thermal runaway of the secondary battery 10. The mixed fluid includes a gas and a liquid at high temperature and high pressure, in which the liquid is mainly an electrolyte.

The breakthrough region 21 of the spray pipeline 20 is arranged corresponding to the weakened portion 11 of the secondary battery 10, so that the heat flow sprayed by the secondary battery in thermal runaway can act directly on the breakthrough region 21 to form an opening. In addition, this allows the spray pipeline 20 to spray the spray medium corresponding to the source of the heat flow, so that spreading of the heat flow may be reduced more effectively, thereby improving the control efficiency of thermal runaway as well as its spreading. In particular, the breakthrough region 21 arranged corresponding to the weakened portion 11 also enables the spray medium to flow into the interior of the housing of the secondary battery 10. It can suppress a reaction such as further thermal decomposition, combustion and the like of the material inside the housing, and control the continued generation of the heat flow, thereby further improving the control efficiency of thermal runaway and its spreading.

In some embodiments, the breakthrough region 21 of the spray pipeline 20 faces directly towards the weakened portion 11 of the secondary battery 10. For example, the housing top of the secondary battery 10 is provided with a vent, with the breakthrough region 21 of the spray pipeline 20 located directly above the vent and spaced apart from the latter.

There may be a plurality of ways to provide a breakthrough region 21 in the spray pipeline 20. As an example, at least a portion of the spray pipeline 20 corresponding to (or facing directly towards) the weakened portion 11 includes a hot melt part. The melting point of the hot melt part is lower than that of other regions of the spray pipeline 20, and the hot melt part can be melted to form the opening at the high temperature of the heat flow sprayed by the secondary battery 10, thereby effecting spraying. For example, the temperature of the heat flow sprayed by the secondary battery 10 in thermal runaway may be above 500° C., such as 600° C. The melting point of the hot melt part is less than the temperature of the heat flow, so that it can be melted under an effect of the high temperature of the heat flow. The melting point of the hot melt part may be 200° C.-500° C., for example, 300° C.-500° C. The melting point of other regions of the spray pipeline 20 is greater than the temperature of the heat flow, so that it provides a flow channel for the spray medium to flow to the secondary battery 10 in thermal runaway for localized spray.

As another example, at least a portion of the spray pipeline 20 corresponding to (or facing directly towards) the weakened portion 11 includes a stress concentration part. The heat flow pressure sprayed by the weakened portion 11 of the secondary battery 10 is relatively high, and under a high-pressure impact of the heat flow, the stress concentration part is broken up due to low strength and stress concentration, thereby forming an opening and realizing spraying. Other regions of the spray pipeline 20 have sufficient strength not to be damaged.

It can be seen that, in the normal work state of the battery pack, the structure of the spray pipeline 20 is complete, and the spray medium is stored in the spray pipeline 20. During the charge and discharge cycle, a complex chemical reaction may occur inside the secondary battery 10, and it generally has a certain internal resistance, so that the secondary battery 10 may generate heat during normal operation. Now the spray medium stored in the spray pipeline 20 can also serve to cool down the secondary battery 10, which is advantageous for improving the cycle life of the secondary battery 10. When the secondary battery 10 sprays a heat flow upon thermal runaway, the heat flow causes the spray pipeline 20 to form an opening. The spray medium with a weight A is sprayed to the secondary battery 10 in thermal runaway via the opening, thereby effectively controlling the thermal runaway and its spreading.

The spray medium may be a material known in the art which can be used to control thermal runaway of the battery. For example, the spray medium may be selected from: fire-control gas, fire-control liquid, fire-control colloid and fire-control powder and the like. As a specific example, the spray medium may be one or more selected from: water, ethylene glycol, liquid nitrogen, liquid argon, liquid carbon dioxide, liquid heptafluoropropane and fluorinated ketone.

In some embodiments, the latent heat D of the spray medium may be above 100 kJ/kg, above 200 kJ/Kg, above 500 kJ/kg, above 1000 kJ/kg, above 1500 kJ/kg, or above 2000 kJ/kg. The latent heat of the spray medium is large, which can absorb more heat, so that the temperature of the secondary battery 10 in thermal runaway and the heat flow released therefrom can be rapidly reduced, thereby improving the effect of alleviating thermal runaway of the battery pack. In addition, when the amount of heat released by thermal runaway of the secondary battery 10 is constant, the greater the latent heat of the spray medium, the less the amount of spray medium is required. It is advantageous for reducing the weight of the entire system.

In some embodiments, the latent heat D of the spray medium may be below 5000 kJ/kg, below 4500 kJ/kg, below 4000 kJ/kg, below 3500 kJ/kg, or below 3000 kJ/kg. In this way, the weight A of the spray medium satisfying the equation (1) is appropriate so that the volume of the spray medium sprayed to alleviate spreading of thermal runaway is appropriate, which can sufficiently acts on the secondary battery 10 in thermal runaway and the heat flow released therefrom, thereby effectively controlling thermal runaway of the secondary battery 10 and its spreading.

There may be a plurality of ways to enable spraying the spray medium of the spray weight A to the abnormal secondary battery 10 in thermal runaway from the spray pipeline 20.

Figure 3:
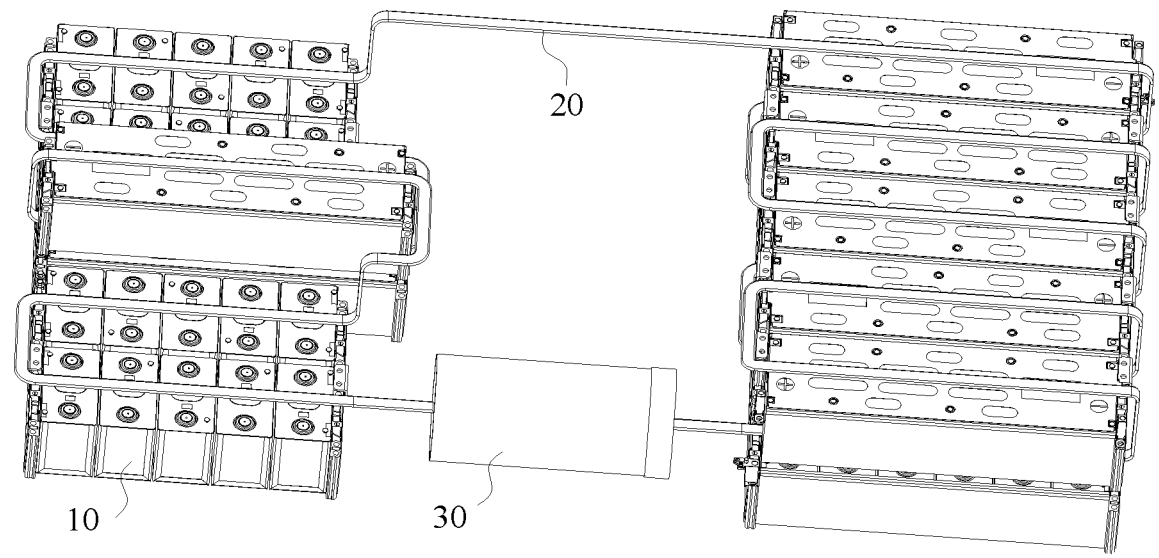
FIG. 3 is a schematic structural view of another battery pack according to an embodiment of the application with the external packing and other accessories of the battery pack omitted

In some embodiments, referring to FIG. 3, the spray pipeline 20 may be a consecutive pipeline which is at least partly corresponding to all the secondary batteries 10 in the battery pack. The pipeline may encapsulate a spray medium greater than or equal to the weight A. When one of the secondary batteries 10 in the battery pack is subjected to thermal runaway, the heat flow causes an opening to form in the breakthrough region 11 of the spray pipeline 20 corresponding to the secondary battery 10, and the spray medium in the pipeline is sprayed from the opening to the secondary battery 10, thereby effectively controlling thermal runaway and its spreading.

Figure 4:
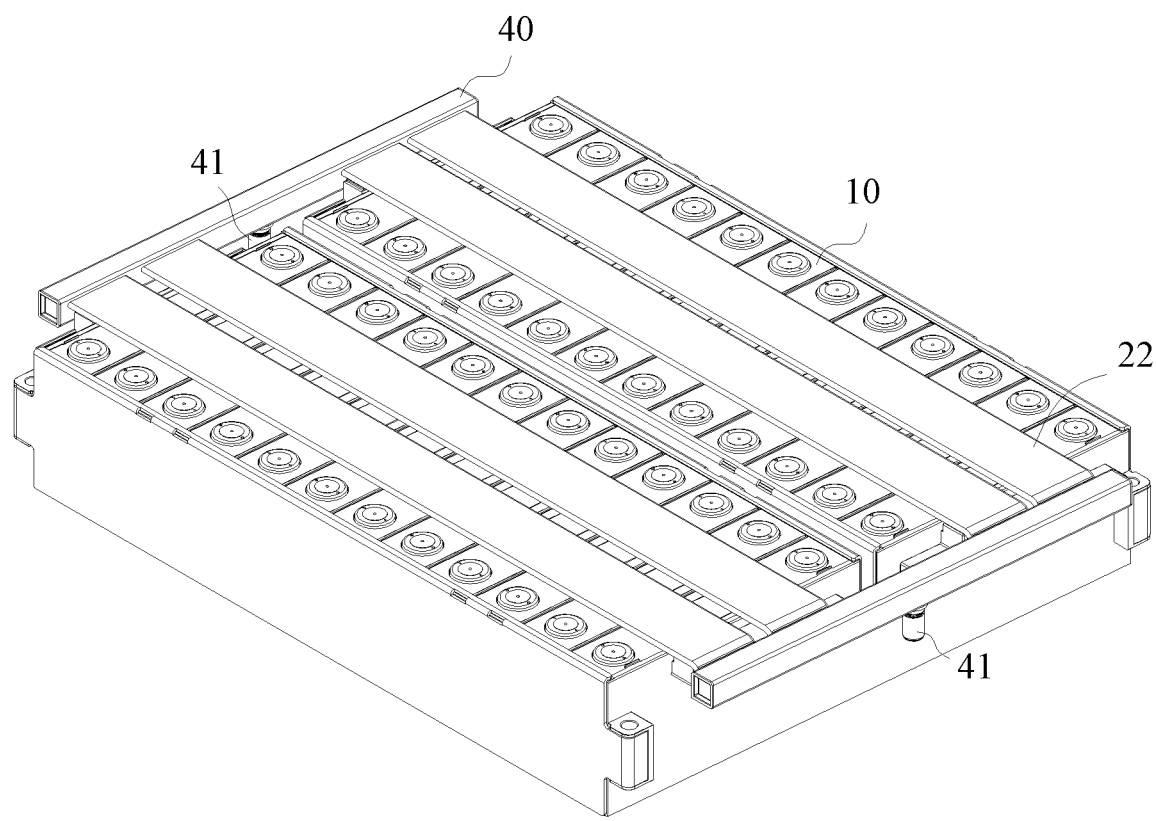
FIG. 4 is a schematic structural view of another battery pack according to an embodiment of the application with the external packing and other accessories of the battery pack omitted

In other embodiments, referring to FIG. 4, the spray pipeline 20 may include a plurality of pipeline units 22, each of which is arranged corresponding to at least one of the battery cells in the battery pack and may encapsulate a spray medium greater than or equal to the weight A. Each battery cell may include more than one secondary battery 10.

For example, the battery pack may include a plurality of battery cells arranged in the width direction of the battery pack, each of which may include a plurality of secondary batteries 10 arranged in the length direction of the battery pack. Each battery cell may be provided with one pipeline unit 22 respectively.

When a certain secondary battery 10 in any battery cell is subjected to thermal runaway, the breakthrough region 11 of the pipeline unit 22 corresponding to the battery cell forms an opening under an action of the heat flow, so that the spray medium in the pipeline unit 22 is sprayed to the secondary battery 10 in thermal runaway, thereby effectively controlling thermal runaway of the secondary battery 10 and its spreading. Since a pipeline unit 22 with a spray medium is provided for each battery cell, when the secondary batteries in a plurality of different battery cells 10 are subjected to thermal runaway, spray mediums of the sufficient weight A can be sprayed to them independently and rapidly by the pipeline units 22 corresponding thereto for position-specific spray. The control efficiency for the thermal runaway as well as the spreading thereof inside the battery pack is further improved.

In some embodiments, the battery pack may further include a storage case 30.

If the spray pipeline 20 is a consecutive pipeline corresponding to all the secondary batteries 10 in the battery pack, the storage case 30 may be in communication with either end or both ends of the consecutive pipeline. Moreover, it may be the case that one storage case 30 is in communication with both ends of the consecutive pipeline respectively; or it may be the case that one of two storage cases 30 is in communication with an end of the consecutive pipeline and the other is in communication with the other end of the consecutive pipeline. Further, at least a portion of the spray pipeline 20 may be located above the secondary batteries 10.

If the spray pipeline 20 includes a plurality of pipeline units 22, the storage case 30 may be in communication with either end or both ends of each pipeline unit 22. For example, there may be a plurality of storage cases 30, each of which is independently in communication with either end or both ends of at least one pipeline unit 22. Alternatively, there may be one storage case 30, to which either end or both ends of each of the plurality of pipeline units 22 is/are connected. That is, the plurality of pipeline units 22 in the spray pipeline 20 are arranged in parallel.

Optionally, the battery pack may includes a sparger 40. The sparger 40 includes a plurality of medium outlets (not shown in the drawings), via which the sparger 40 can be in communication with the plurality of pipeline units 22 respectively. As shown in FIG. 4, two spargers 40 are disposed at the opposite ends of the plurality of pipeline units 22 respectively with one sparger 40 in communication with one end of each pipeline unit 22 and the other sparger 40 in communication with the other end of each pipeline unit 22. A connection port 41 of the sparger 40 is in communication with the storage case 30. The sparger 40 is disposed between the storage case 30 and the spray pipeline 20 to split the spray medium in the storage case 30 into different pipeline units 22.

The storage case 30 in the battery pack may store the spray medium and is in communication with the spray pipeline 20. When the spray pipeline 20 sprays the spray medium to a secondary battery 10 in thermal runaway, the storage case 30 may provide the spray medium to the spray pipeline 20 to meet the consumption demand of spray medium to control the thermal runaway. That is, the spray medium greater than or equal to the weight A is stored in the spray pipeline 20 and the storage case 30. Moreover, it is possible to reduce the volume and weight of the spray pipeline 20 by storing a portion of the spray medium in the storage case 30, so that the volume and weight of the overall system can be reduced.

A large amount of high temperature fluid may be produced upon thermal runaway of the secondary battery 10, resulting in a sharp increase in pressure inside the housing of the secondary battery 10. The study by the applicant found that the spray pressure P at which the opening of the spray pipeline 20 sprays to the secondary battery 10 in thermal runaway satisfies the equation (2) below, where the resistance force to convey the spray medium in the spray pipeline 20 and the pressure of the high temperature fluid may be overcome, so that more timely and efficient spraying of the spray medium to the secondary battery 10 in thermal runaway may be achieved. The control efficiency for the thermal runaway of the secondary battery 10 as well as the spreading thereof inside the battery pack can thereby be further improved.

$$\frac{P}{(0.06B+5)} \geq 1 \qquad (2)$$

in which P indicates the spray pressure of the spray pipeline 20 by kPa, and B indicates the capacity of the secondary battery 10 by Ah.

Optionally, $$\frac{P}{(0.0B+5)} \geq 1.4.$$

Also, only numerical calculation is involved in the equation (2). For example, the spray pressure P of the spray pipeline 20 is 120 kPa, and the capacity of the secondary battery 10 is 180 Ah, which satisfy:

$$\frac{P}{(0.06B+5)} = \frac{120}{(0.06 \times 180 + 5)} = 7.59 > 1.$$

In some embodiments, the spray pressure P of the spray pipeline 20 may be above 10 kPa, above 12 kPa, above 20 kPa, above 30 kPa, or above 50 kPa. It is advantageous for more effective control of thermal runaway of the secondary battery 10 as well as the spreading thereof. The spray pressure P of the spray pipeline 20 may be below 150 kPa, below 120 kPa, below 100 kPa, or below 80 kPa. It may prevent a damage such as a breakage of the secondary battery 10 due to an excessive spray pressure, in order to avoid the high temperature and high pressure fluid spreading around, which is advantageous for alleviating the spreading of the thermal runaway inside the battery pack.

There may be a plurality of ways to achieve the spray pressure of P at which the opening of the spray pipeline 20 sprays to the secondary battery 10 in thermal runaway.

In some embodiments, the battery pack includes a storage case 30 with a height difference between the storage case 30 and the opening. Specifically, the storage case 30 is located at a position higher than the opening of the spray pipeline 20. As such, when the spray pipeline 20 is formed with an opening to spray, the spray medium in the storage case 30 due to the height difference applies a pressure to the spray medium in the spray pipeline 20, so that the spray pressure in the spray pipeline 20 reaches at P.

Figure 5:
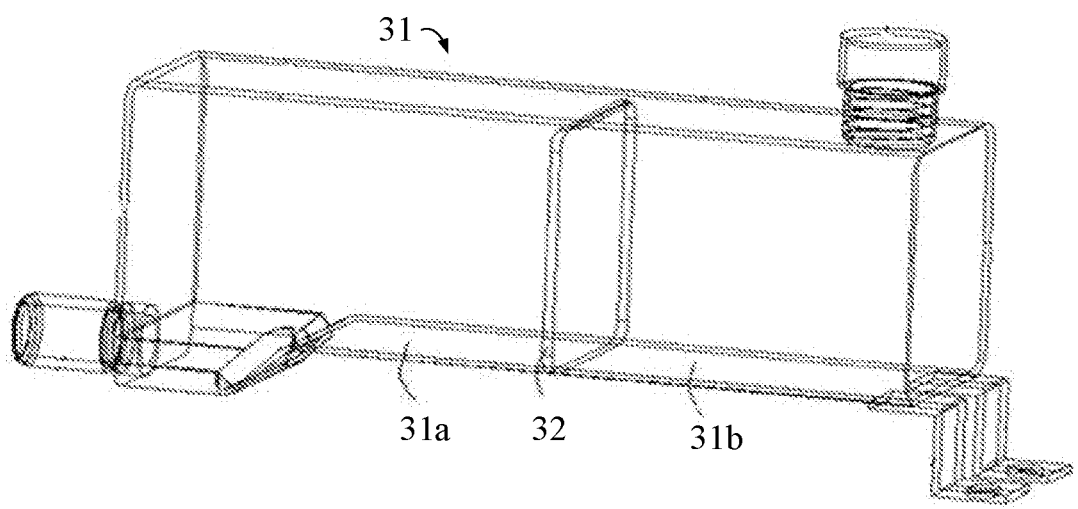
FIG. 5 is a schematic structural view of a storage case according to an embodiment of the application.

In some other embodiments, referring to FIG. 5, the storage case 30 includes a case body 31 including a cavity. A separator 32 is provided in the case body and separates the case body 31 into a liquid storage part 31a and a gas storage part 31b. The liquid storage part 31a is in communication with the spray pipeline 20. The gas storage part 31b includes an inlet for inflow of a compressed gas to fill the gas storage part 31b with gases. The separator 32 is able to drive the spray medium in the liquid storage part 31a into the spray pipeline 20 under an action of the compressed gas in the gas storage part 31b.

In the normal operation state of the battery pack, the spray medium is stored in the liquid storage part 31a and the spray pipeline 20. Now the acting force of the spray medium in the liquid storage part 31a on the separator 32 is balanced with the acting force of the compressed gas in the gas storage part 31b on the separator 32. When a secondary battery 10 is subjected to thermal runaway, an opening forms in the spray pipeline 20 under an action of the heat flow, and the spray medium is sprayed to the secondary battery 10 in thermal runaway via the opening. Now the acting force of the spray medium in the liquid storage part 31a on the separator 32 reduces, and the compressed gas in the gas storage part 31b applies a drive force to the spray medium on the opposite side via the separator 32, so that the spray pressure of the spray pipeline 20 reaches at P. If necessary, gases may be added to the gas storage part 31b via the inlet of the gas storage part 31b to ensure that the compressed gas in the gas storage part 31b has a sufficient pressure, thereby satisfying the requirement for the spray pipeline 20 to spray the spray medium with the weight A and the spray pressure P.

Optionally, the separator 32 may be an elastic separator film. When the spray pipeline 20 sprays, the acting force of the spray medium in the liquid storage part 31a on the elastic separator film reduces, so that the elastic separator film is expanded under an action of the compressed gas in the gas storage part 31b in order to cause the compressed gas to apply a pressure to the spray medium. As an example, the elastic separator film may be an involucra, such as an EPDM (Ethylene Propylene Diene Monomer) involucra.

Optionally, the separator 32 may also be a separator plate slidably connected to an inner wall of the case body 31. Thereby when the spray pipeline 20 sprays, the acting force of the spray medium in the liquid storage part 31a on the separator plate reduces, so that the separator plate can move in the direction facing towards a fluid outlet of the liquid storage part 31a under an action of the compressed gas in the gas storage part 31b. As such, the compressed gas can apply a pressure to the spray medium via the separator plate.

Further, a sliding seal may also be provided between the outer peripheral wall of the separator plate and the inner wall of case body 31. By providing the sliding seal, it is possible to move the separator plate relative to the inner wall of the case body 31 while maintaining a good sealing effect and reducing the risk of the spray medium and/or the compressed gas flowing through between the outer peripheral wall of the separator plate and the inner wall of the case 31, so that the sensitivity of the motion of the separator plate is improved. For example, the sliding seal may be a packing seal or the like.

Figure 6:
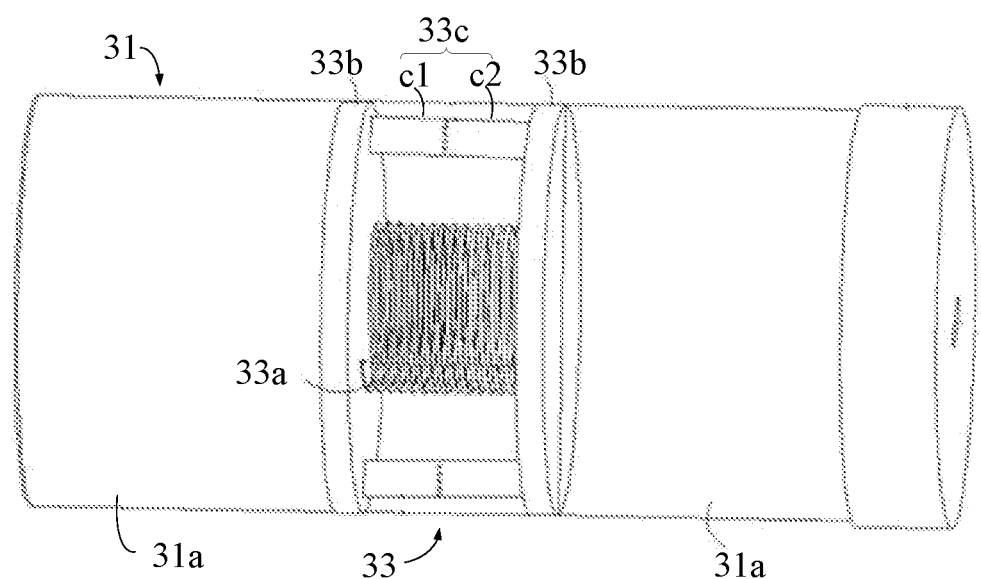
FIG. 6 is a schematic structural view of another storage case according to an embodiment of the application.

In some other embodiments, referring to FIG. 6, the storage case 30 includes a case body 31 including a cavity, with a drive device 33 provided in the case body. The drive device 33 includes an elastic member 33a and a drive member 33b. The elastic member 33a is connected to the drive member 33b, and the drive member 33b and a wall of the case body 31 enclose and form a liquid storage part 31a in communication with the spray pipeline 20. The drive member 33a is able to drive the spray medium in the liquid storage part 31a into the spray pipeline 20 under an action of an elastic force of the elastic member 33a.

In the normal operation state of the battery pack, the spray medium is stored in the liquid storage part 31a and the spray pipeline 20. Now the acting force of the spray medium in the liquid storage part 31a on the drive member 33b is balanced with the pressure of the elastic member 33a on the drive member 33b. When a secondary battery 10 is subjected to thermal runaway, an opening forms in the spray pipeline 20 under an action of the heat flow, and the spray medium is sprayed to the secondary battery 10 in thermal runaway via the opening. Now the acting force of the spray medium in the liquid storage part 31a on the separator 32 reduces, and the elastic member 33a applies a drive force to the spray medium on the opposite side via the drive member 33b, so that the spray pressure of the spray pipeline 20 reaches at P.

An elastic member 33a with an appropriate elastic force may be selected according to actual needs to ensure that it can provide a sufficient pressure to the spray medium to satisfy the spray amount and the spray pressure of the spray media at the opening. For example, the elastic member 33a may be selected from a spring, an elastic rubber, or the like.

The drive member 33b may be a drive plate. The drive plate is slidably connected to an inner wall of the case body 31. Further, a sliding seal may also be provided between the outer peripheral wall of the drive plate and the inner wall of the case body 31. The function and type of the sliding seal may be those as previously described.

As an example, one end of the elastic member 33a is connected to the inner wall of the case body 31, which may be an interference connection or a fixed connection. The other end of the elastic member 33a is connected to the drive member 33b. When the spray pipeline 20 is not spraying, the spray medium in the liquid storage part 31a compresses the elastic member 33a via the drive member 33b, and the drive system is in a balanced and stable state. When the spray pipeline 20 sprays, the acting force of the spray medium in the liquid storage part 31a on the drive member 33b reduces, and the elastic restoring force of the elastic member 33a acts on the spray medium via the drive member 33b, so that the spray pressure of the spray pipeline 20 reaches at P.

As another example, the drive member 33b is connected with elastic members 33a at both ends respectively. Two drive members 33b and the inner wall of the case body 31 enclose and form two liquid storage parts 31b respectively. The two liquid storage parts 31b are each provided with a fluid outlet which may be connected to one port of the spray pipeline 20 respectively. For example, the two liquid storage parts 31b are connected to both ends of the aforesaid consecutive pipeline respectively, or are connected to both ends of the aforesaid pipeline unit 22. That is, the spray medium can enter from both ends of the consecutive pipeline or the pipeline unit 22 and be sprayed via the opening. This makes it possible to increase the weight A and the pressure P of the spray medium and to improve the effect of controlling thermal runaway and its spreading.

Further, a limit member 33c may be provided between the drive members 33b at both ends of the elastic member 33a.

When the spray pipeline 20 does not spray the spray medium, the limit member 33c can strengthen the balance stability of the drive system. When the spray pipeline 20 sprays the spray medium, the limit member 33c releases the limit action under an action of an elastic force of the elastic member 33a, so that the elastic member 33a applies the drive force to the spray medium.

As an example, the limit member 33c includes a first limit arm c1 connected to one of the two drive members 33b, and a second limit arm c2 connected to the other of the two drive members 33b. When the spray pipeline 20 does not spray, the first limit arm c1 and the second limit arm c2 are bonded to each other, whereby the limit member 33c plays a role of limit to enhance the balance stability of the drive system. When the spray pipeline 20 sprays, under the action of the elastic force of the elastic member 33a, the bonding between the first limit arm c1 and the second limit arm c2 is released, thereby releasing the limit action, so that the elastic member 33a applies a drive force to the spray medium. The bonding between the first limit arm c1 and the second limit arm c2 can be achieved by glue, glue strips or the like.

There may be one or more limit members 33c disposed on the outer peripheral side of the elastic member 33a, such as two or three limit members 33c uniformly distributed on the inner peripheral side of the elastic member 33a.

An embodiment of the application further provides a vehicle. The vehicle includes any battery pack in the embodiments of the application.

It will be appreciated that the vehicle may be, but is not limited to, a hybrid vehicle, a pure electric vehicle, or the like. In some embodiments, the vehicle may include a power source to supply power to the vehicle, and the battery pack is configured to supply electric energy to the power source.

The vehicle of the embodiments of the application adopts the battery pack of the embodiments of the application, and thus may also have corresponding advantageous effects, where the vehicle has a higher safety performance. When there is a secondary battery subjected to thermal runaway in the battery pack, the spreading of the thermal runaway of the battery pack can be effectively alleviated, which greatly prolongs the escape time for a person in the vehicle, thereby ensuring the personnel safety to a greater extent.

An embodiment of the application further provides a control method for alleviating spreading of thermal runaway of a battery pack, in which the battery pack is any battery pack according to the embodiments of the application. The control method for alleviating spreading of thermal runaway of a battery pack in the embodiment of the application includes:

S10, the heat flow resulting from thermal runaway of the secondary battery breaking through the weakened portion and acting on the spray pipeline, so that the breakthrough region of the spray pipeline forms the opening under the action of the heat flow.

S20, the spray medium being sprayed to the abnormal secondary battery in thermal runaway via the opening to alleviate the spreading of the thermal runaway of the secondary battery. The weight A of the spray medium which is sprayed to alleviate the spreading of the thermal runaway of the abnormal secondary battery is determined according to the above equation (1).

In the control method for alleviating spreading of thermal runaway of a battery pack in the embodiment of the application, the heat flow resulting from thermal runaway of the secondary battery can break through the weakened portion of its housing to be discharged and act on the breakthrough region of the spray pipeline. The breakthrough region forms an opening under the action of the heat flow, so that the spray medium in the spray pipeline is sprayed to an abnormal secondary battery in thermal runaway via the opening. Also, the weight A of the spray medium which is sprayed to alleviate the spreading of the thermal runaway of the abnormal secondary battery satisfies the equation (1). Thus, the spray medium can effectively reduce the high temperature resulting from thermal runaway of the secondary battery and prevent the heat from spreading to other secondary batteries, so that the thermal runaway of the abnormal secondary battery is controlled effectively while the spreading of the thermal runaway in the battery pack is alleviated effectively. Therefore, the control method for alleviating spreading of thermal runaway of a battery pack in the embodiment of the application enables a relatively high safety performance of the battery pack.

In addition, in the control method for alleviating spreading of thermal runaway of a battery pack in the embodiment of the application, it is the heat flow discharged upon thermal runaway of the secondary battery that triggers the spray pipeline to spray. The method responses quickly and accurately to thermal runaway of the secondary battery. In addition, the thermal runaway monitoring device and the spray control device provided in the battery pack may be dispensed with by means of the method, so that the structure of the battery pack is simple, and in particular, both the weight and the volume of the battery pack are relatively small, which is advantageous for the battery pack to have a high weight energy density and volumetric energy density.

Other details described herein for the battery pack in the embodiments of the application can also be applied to the method of this application, which will not be repeated here.

EMBODIMENTS

The following examples, which describe the disclosure of the application in more detail, are provided for illustrative purposes only, as various modifications and variations will be apparent to a person skilled in the art within the scope of the disclosure. Unless indicated otherwise, all of the reagents used in the examples are commercially available or synthesized according to conventional methods and can be used directly without further processing, and all the instruments used in the examples are commercially available.

Embodiment 1

The battery pack is shown in FIG. 1, and includes a plurality of lithium ion secondary batteries, a spray pipeline located above the plurality of secondary batteries and spaced apart therefrom, and a storage case connected to the spray pipeline. A housing of each secondary battery includes a weakened portion, so that a heat flow resulting from thermal runaway of the secondary battery is able to break through the weakened portion to be discharged. The portion of the spray pipeline facing directly towards the weakened portion of the lithium ion secondary battery is a breakthrough region which is able to form an opening under the action of the heat flow. The structure of the storage case is as shown in FIG. 5, which includes a case body including a cavity and a separator plate located in the cavity of the case body, and the separator plate separates the case body into a liquid storage part and a gas storage part. The liquid storage part is in communication with the spray pipeline, and the liquid storage part and the spray pipeline are provided with a spray liquid therein. The gas storage part has a compressed gas therein. The separator plate is able to drive the spray medium in the liquid storage part into the spray pipeline under the action of the compressed gas in the gas storage part. The capacity B of the secondary battery is 180 Ah, the latent heat D of the spray liquid is 2000 kJ/kg, and the weight A of the spray liquid sprayed by the spray pipeline is 0.27 kg.

One of the secondary batteries in the battery pack is caused to undergo thermal runaway, for example, by overcharging, needling, or heating the secondary battery. The heat flow resulting from thermal runaway of the secondary battery breaks through the weakened portion and acts on the spray pipeline. The breakthrough region forms the opening under the action of the heat flow. The spray medium is sprayed to the secondary battery in thermal runaway via the opening to control thermal runaway and its spreading of the secondary battery.

Ten battery packs are tested and the success rate of thermal runaway control is recorded.

Control success rate of thermal runaway=number of battery packs without thermal runaway/total number of tested battery packs×100%

Embodiments 2-19 and Comparative Examples 1-5

It is similar to embodiment 1 with the exception that the related parameters of the battery pack are adjusted. Please see Table 1 for details.

TABLE 1

| Number | Capacity of Secondary Battery B [Ah] | Latent Heat of Spray Liquid D [kJ/kg] | Spray Liquid Amount Sprayed by Opening A [kg] | Spray Pressure of Opening P [kPa] | X | Y | Success Rate of Thermal Runaway Spreading Control [%] |
|---|---|---|---|---|---|---|---|
| Embodiment 1 | 180 | 2000 | 0.27 | 16 | 3.02 | 1.01 | 100 |
| Embodiment 2 | 180 | 2000 | 0.53 | 16 | 5.36 | 1.01 | 100 |
| Embodiment 3 | 180 | 2000 | 2.13 | 16 | 17.48 | 1.01 | 100 |
| Embodiment 4 | 180 | 112 | 6.82 | 16 | 2.63 | 1.01 | 100 |
| Embodiment 5 | 180 | 112 | 6.82 | 120 | 2.63 | 7.59 | 100 |
| Embodiment 6 | 180 | 112 | 6.82 | 80 | 2.63 | 5.06 | 100 |
| Embodiment 7 | 180 | 112 | 6.82 | 30 | 2.63 | 1.90 | 100 |
| Embodiment 8 | 180 | 112 | 6.82 | 14 | 2.63 | 0.89 | 80 |
| Embodiment 9 | 95 | 112 | 3.55 | 12 | 2.86 | 1.12 | 100 |
| Embodiment 10 | 95 | 112 | 3.55 | 30 | 2.86 | 2.80 | 100 |
| Embodiment 11 | 95 | 112 | 3.55 | 15 | 2.86 | 1.40 | 100 |
| Embodiment 12 | 95 | 112 | 3.55 | 10 | 2.86 | 0.93 | 90 |
| Embodiment 13 | 51 | 112 | 1.70 | 12 | 2.85 | 1.49 | 100 |
| Embodiment 14 | 51 | 112 | 1.70 | 6 | 2.85 | 0.74 | 60 |
| Embodiment 15 | 51 | 112 | 1.70 | 4 | 2.85 | 0.50 | 40 |
| Embodiment 16 | 205 | 2000 | 0.32 | 18 | 3.06 | 1.04 | 100 |
| Embodiment 17 | 205 | 2000 | 0.32 | 40 | 3.06 | 2.31 | 100 |
| Embodiment 18 | 205 | 2000 | 0.32 | 30 | 3.06 | 1.73 | 100 |
| Embodiment 19 | 205 | 2000 | 0.32 | 25 | 3.06 | 1.45 | 100 |
| Comparative Example 1 | 180 | 2000 | 0.21 | 16 | 2.44 | 1.01 | 0 |
| Comparative Example 2 | 180 | 112 | 5.68 | 16 | 2.25 | 1.01 | 0 |
| Comparative Example 3 | 95 | 112 | 2.56 | 12 | 2.17 | 1.12 | 0 |
| Comparative Example 4 | 51 | 112 | 1.14 | 12 | 2.03 | 1.49 | 0 |

TABLE 1-continued

| Number | Capacity of Secondary Battery B [Ah] | Latent Heat of Spray Liquid D [kJ/kg] | Spray Liquid Amount Sprayed by Opening A [kg] | Spray Pressure of Opening P [kPa] | X | Y | Success Rate of Thermal Runaway Spreading Control [%] |
|---|---|---|---|---|---|---|---|
| Comparative Example 5 | 205 | 2000 | 0.21 | 18 | 2.14 | 1.04 | 0 |

Note:
in Table 1

$$X = \frac{(0.8A)^{0.85} \times D}{B};$$

$$Y = \frac{P}{(0.06B + 5)}.$$

As can be seen from the results of table 1, a spray pipeline is provided in the battery pack of the application and includes a breakthrough region in the weakened portion corresponding to the housing of the secondary battery. The breakthrough region is able to form an opening under the action of the heat flow resulting from thermal runaway of the secondary battery, so that the spray medium in the spray pipeline is sprayed to the abnormal secondary battery in thermal runaway via the opening. Also, the weight A of the spray medium which is sprayed to alleviate the spreading of the thermal runaway of the abnormal secondary battery satisfies the equation (1). Thus, the spray medium can effectively reduce the high temperature resulting from thermal runaway of a secondary battery and prevent the heat from spreading to other secondary batteries, so that the thermal runaway of the abnormal secondary battery is controlled effectively while the spreading of the thermal runaway in the battery pack is alleviated effectively. Therefore, the battery pack of the application has a relatively high safety performance.

Further, the weight of the spray medium sprayed to the abnormal secondary battery by the battery pack in the comparative example cannot satisfy the equation (1). When a secondary battery in the battery pack is subjected to thermal runaway, it is impossible to control thermal runaway of the secondary battery, so that the thermal runaway spreads in the battery pack, which is a serious potential safety hazard.

The above description is only specific embodiments of the application, but the protection scope of the application is not limited thereto. Various equivalent modifications or substitutions are readily conceivable within the technical scope disclosed herein for any person skilled in the art, which are intended to be covered in the protection scope of the application. Therefore, the protection scope of the application should be subject to that of the claims.

What is claimed is:

1. A battery pack, comprising:
a plurality of secondary batteries, a housing of each of which comprises a weakened portion, so that a heat flow resulting from thermal runaway of each of the plurality of secondary batteries is able to break through respective weakened portion to be discharged;
a spray pipeline which is arranged corresponding to and at a spacing from weakened portions of the plurality of secondary batteries, at least a portion of the spray pipeline corresponding to the weakened portions being a breakthrough region which is able to form an opening under an action of the heat flow, a spray medium in the spray pipeline being sprayed to an abnormal secondary battery in thermal runaway via the opening;
wherein a weight A of the spray medium which is sprayed to alleviate spreading of the thermal runaway of the abnormal secondary battery is determined according to an equation (1), $$\frac{(0.8A)^{0.85} \times D}{B} \geq 2.6 \quad (1)$$

in which, A indicates the weight of the spray medium by kg; D indicates a latent heat of the spray medium by kJ/kg; B indicates a capacity of a secondary battery of the plurality of secondary batteries by Ah;
wherein the battery pack further comprises a storage case; the spray pipeline is configured to be connected to the storage case and at least a portion of the spray pipeline is located above the plurality of secondary batteries; or
the spray pipeline comprises a plurality of pipeline units arranged in parallel, each of which is arranged corresponding to at least one of the plurality of secondary batteries and is configured to connect to the storage case;
wherein the storage case comprises:
a case body comprising a cavity;
a separator located in the cavity of the case body, the separator separating the case body into a liquid storage part and a gas storage part, wherein the liquid storage part is in communication with the spray pipeline, the gas storage part comprising an inlet for inflow of a compressed gas, the separator being able to drive the spray medium in the liquid storage part into the spray pipeline under an action of the compressed gas in the gas storage part.

2. The battery pack according to claim 1, wherein $$2.6 \leq \frac{(0.8A)^{0.85} \times D}{B} \leq 17.48.$$

3. The battery pack according to claim 2, wherein $$2.63 \leq \frac{(0.8A)^{0.85} \times D}{B} \leq 5.36.$$

4. The battery pack according to claim 1, wherein the latent heat D of the spray medium is above 100 kJ/kg.

5. The battery pack according to claim 1, wherein a spray pressure P of the spray pipeline is determined according to an equation (2), $$\frac{P}{(0.06B+5)} \geq 1 \quad (2)$$

in which, P indicates the spray pressure of the spray pipeline by kPa.

6. The battery pack according to claim 5, wherein $$\frac{P}{(0.0B+5)} \geq 1.4.$$

7. The battery pack according to claim 1, wherein the spray pressure P of the spray pipeline is above 10 kPa.

8. The battery pack according to claim 1, wherein the breakthrough region of the spray pipeline faces directly towards the weakened portions of the plurality of secondary batteries.

9. The battery pack according to claim 1, wherein the spray medium is one or more selected from: fire-control gas, fire-control liquid, fire-control colloid and fire-control powder.

10. The battery pack according to claim 1, wherein the storage case is arranged higher than the breakthrough region of the spray pipeline.

11. The battery pack according to claim 1, wherein
the separator is an elastic separator film; or
the separator is a separator plate slidably connected to an inner wall of the case body.

12. The battery pack according to claim 11, wherein the elastic separator film is an involucra.

13. The battery pack according to claim 1, wherein
the breakthrough region comprises a hot melt part, the hot melt part is configured to be melted by the heat flow sprayed through the weakened portion of one of the plurality of secondary batteries, and form the opening; or
the breakthrough region comprises a stress concentration part, the stress concentration part is configured to break up under an impact action of the heat flow sprayed through the weakened portion of one of the plurality of secondary batteries, and form the opening.

14. The battery pack according to claim 13, wherein a melting point of the hot melt part is 200° C.-500° C.

15. The battery pack according to claim 1, wherein the weakened portion is a vent disposed on the housing; or
the weakened portion is formed through providing a notch or a thickness-reduced region on the housing.

16. A vehicle, comprising the battery pack according to claim 1.

17. A control method for alleviating spreading of thermal runaway of a battery pack, wherein the battery pack is the battery pack according to claim 1, the method comprising:
the heat flow resulting from thermal runaway of at least one secondary battery of the plurality of secondary batteries breaking through respective weakened portion and acting on the spray pipeline, so that the breakthrough region forms the opening under the action of the heat flow;
the spray medium being sprayed to the at least one secondary battery in thermal runaway via the opening to alleviate the spreading of the thermal runaway of the secondary battery.

* * * * *